United States Patent
Papancea et al.

(10) Patent No.: US 12,190,416 B1
(45) Date of Patent: Jan. 7, 2025

(54) METHOD AND APPARATUS FOR CONTEXTUALLY INTELLIGENT GRAPH GENERATION

(71) Applicant: NLX Inc., New York, NY (US)

(72) Inventors: Andrei Papancea, New York, NY (US); Vlad Papancea, New York, NY (US); Peter Szerzo, Berlin (DE)

(73) Assignee: NLX Inc., New York, NY (US)

( * ) Notice: Subject to any disclaimer, the term of this patent is extended or adjusted under 35 U.S.C. 154(b) by 0 days.

(21) Appl. No.: 18/798,014

(22) Filed: Aug. 8, 2024

Related U.S. Application Data

(60) Provisional application No. 63/518,267, filed on Aug. 8, 2023.

(51) Int. Cl.
G06F 40/40 (2020.01)
G06T 11/20 (2006.01)

(52) U.S. Cl.
CPC ........... G06T 11/206 (2013.01); G06F 40/40 (2020.01); G06T 2200/24 (2013.01)

(58) Field of Classification Search
CPC ... G06T 11/206; G06T 11/20; G06T 2200/24; G06F 40/20; G06F 40/30; G06F 40/40
See application file for complete search history.

(56) References Cited

U.S. PATENT DOCUMENTS

| | | | |
|---|---|---|---|
| 5,892,813 A | 4/1999 | Morin et al. | |
| 7,123,709 B1 | 10/2006 | Montgomery et al. | |
| 7,406,657 B1 | 7/2008 | Callaghan et al. | |
| 7,693,720 B2 | 4/2010 | Kennewick et al. | |
| 8,046,213 B2 | 10/2011 | Bakis et al. | |
| 8,195,468 B2 | 6/2012 | Weider et al. | |
| 8,761,379 B2 | 6/2014 | Davis et al. | |
| 8,983,383 B1 | 3/2015 | Haskin | |
| 9,325,845 B2 | 4/2016 | Nguyen et al. | |
| 9,521,259 B2 | 12/2016 | Davis et al. | |
| 9,955,205 B2 | 4/2018 | Covell et al. | |

(Continued)

FOREIGN PATENT DOCUMENTS

| | | |
|---|---|---|
| WO | WO-2019236120 A1 | 12/2019 |
| WO | WO-2022109149 A1 | 5/2022 |

OTHER PUBLICATIONS

CallVU, CallVU Visual IVR—Banking, [Online], Screenshots, Retrieved from the Internet: https://www.youtube.com/watch?v=94IIhLCNbZ0 , Sep. 2020, 2 pages.

ChoiceView, ChoiceView Visual IVR Insurance Claim [Online], Screenshots, Retrieved from the Internet: https://www.youtube.com/watch?v=FCFGZLp7qOE , Sep. 2020, 2 pages.

(Continued)

*Primary Examiner* — Huyen X Vo

(74) *Attorney, Agent, or Firm* — COOLEY LLP

(57) ABSTRACT

In an embodiment, a representation of a first natural language prompt is received. A representation of the first natural language prompt is sent to a large language model (LLM) configured to identify a first pattern based on the first natural language prompt. A first main inlet associated with the first pattern at a graph, a first success outlet associated with the first pattern at the graph, and a first error outlet associated with the first pattern at the graph is determined based on the graph. A first modification is determined based on the first main inlet, the first success outlet, and the first error outlet. The graph is modified based on the first modification to generate a first modified graph.

20 Claims, 7 Drawing Sheets

(56) References Cited

U.S. PATENT DOCUMENTS

| | | |
|---|---|---|
| 9,961,120 B2 | 5/2018 | Krishnan et al. |
| 10,051,131 B2 | 8/2018 | Saylor et al. |
| 10,469,664 B2 | 11/2019 | Pirat et al. |
| 10,484,539 B2 | 11/2019 | Kumar et al. |
| 10,523,816 B1 | 12/2019 | Neuer, III et al. |
| 10,637,989 B1 | 4/2020 | Josh et al. |
| 11,276,407 B2 | 3/2022 | Reshef et al. |
| 11,461,562 B2 | 10/2022 | Papancea |
| 11,687,737 B2 | 6/2023 | Papancea |
| 2002/0090062 A1 | 7/2002 | Mohamed Alhadad et al. |
| 2003/0162561 A1 | 8/2003 | Johnson et al. |
| 2003/0234763 A1 | 12/2003 | Hejza Litwiller |
| 2005/0010418 A1 | 1/2005 | McNair et al. |
| 2009/0149158 A1 | 6/2009 | Goldfarb et al. |
| 2009/0247136 A1 | 10/2009 | Srinivasan et al. |
| 2012/0069975 A1 | 3/2012 | Odinak et al. |
| 2013/0007147 A1 | 1/2013 | Toga et al. |
| 2013/0108994 A1 | 5/2013 | Srinivasa et al. |
| 2016/0171772 A1 | 6/2016 | Ryznar et al. |
| 2016/0219147 A1 | 7/2016 | Maxwell et al. |
| 2016/0301810 A1 | 10/2016 | Dimitroff et al. |
| 2017/0285848 A1 | 10/2017 | Rosenberg et al. |
| 2017/0324868 A1 | 11/2017 | Tamblyn et al. |
| 2017/0359463 A1 | 12/2017 | Segalis et al. |
| 2018/0052884 A1* | 2/2018 | Kale ............... G06F 16/242 |
| 2019/0037077 A1 | 1/2019 | Konig et al. |
| 2019/0139432 A1 | 5/2019 | Jain et al. |
| 2019/0377544 A1 | 12/2019 | Darachi, Jr. et al. |
| 2020/0177730 A1 | 6/2020 | Dutta et al. |
| 2021/0084150 A1 | 3/2021 | Nagy |
| 2021/0124782 A1* | 4/2021 | Karaca ............ G06F 16/90328 |
| 2022/0164550 A1 | 5/2022 | Papancea et al. |
| 2023/0004731 A1 | 1/2023 | Papancea et al. |
| 2023/0065468 A1* | 3/2023 | Lu ................. G10L 15/063 |
| 2023/0274103 A1 | 8/2023 | Papancea et al. |
| 2024/0311348 A1* | 9/2024 | Lutz ................ G06F 16/258 |

OTHER PUBLICATIONS

International Search Report and Written Opinion for International Application No. PCT/US2021/059911, mailed Mar. 1, 2022, 15 pages.

Office Action for U.S. Appl. No. 18/315,027 mailed Aug. 13, 2024, 28 pages.

Office Action for U.S. Appl. No. 17/532,662, mailed Apr. 4, 2022, 16 pages.

Office Action for U.S. Appl. No. 17/932,162, mailed Nov. 15, 2022, 9 pages.

Plum IVR Support, "How to Extend the Time the Caller Has to Enter Numbers," [Online], Feb. 2010, Retrieved from the Internet: https://support.plumvoice.com/viewtopic.php?f=2&t=591 , 4 pages.

Uniphore, "Multimodal User Experience Design Best Practices," [Online], Aug. 2021, Retrieved from the Internet: https://www.uniphore.com/blog/multimodal-user-experience-design-best-practices/ , 8 pages.

Uniphore, "What's a Multimodal Customer Experience?" [Online], Oct. 2019, Retrieved from the Internet: https://www.uniphore.com/blog/what-s-a-multimodal-customer-experience/ , 1 page.

Hu, Y. et al., "Code prompting: a neural symbolic method for complex reasoning in large language models," arXiv:2305.18507v2 [cs.CL], Oct. 2023, 33 pages.

Huang, Q. et al., "PRODIGY: Enabling In-context Learning Over Graphs," arXiv:2305.12600v1 [cs.LG], May 2023, 15 pages.

International Search Report and Written Opinion for International Application No. PCT/US2024/041520, mailed Oct. 30, 2024, 15 pages.

John, R. J. L. et al., "A natural language interface for dissemination of reproducible biomedical data science," Med Image Comput Comput Assist Interv., Sep. 2018, vol. 11073, pp. 197-205. doi: 10.1007/978-3-030-00937-3_23. Epub Sep. 13, 2018.

Office Action for European Application No. 21835458.7 mailed Oct. 28, 2024, 10 pages.

Office Action for U.S. Appl. No. 18/315,027 mailed Nov. 12, 2024, 25 pages.

* cited by examiner

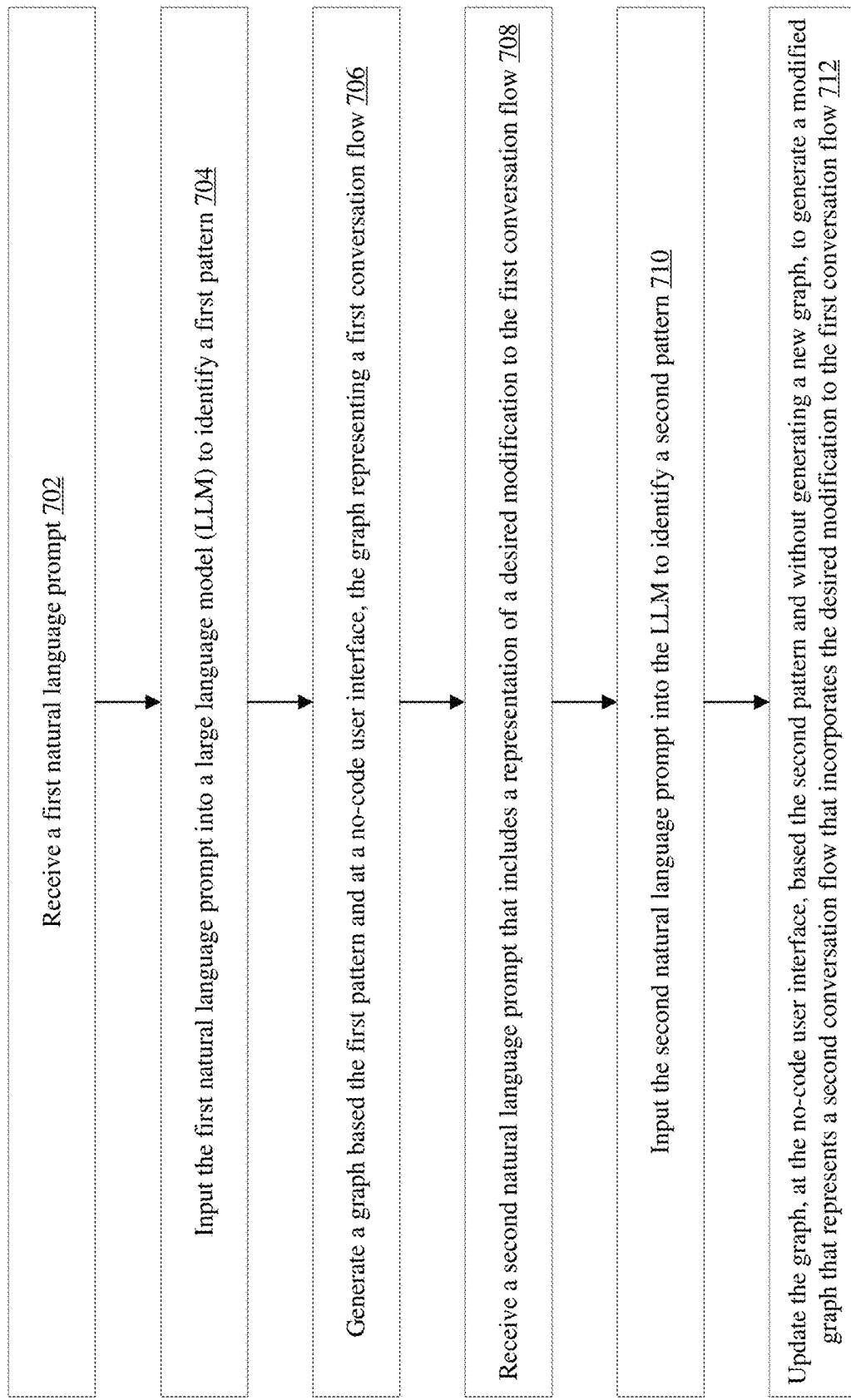

METHOD AND APPARATUS FOR CONTEXTUALLY INTELLIGENT GRAPH GENERATION

CROSS-REFERENCE TO RELATED APPLICATION

This application claims priority to and the benefit of U.S. Provisional Application No. 63/518,267, filed Aug. 8, 2023 and titled "Methods and Apparatus for Contextually Intelligent Graph Generation," the content of which is incorporated herein by reference in its entirety.

FIELD

One or more embodiments relate to the automatic no-code generation of contextually intelligent graphs based on user prompts that are analyzed by a large language model (LLM).

BACKGROUND

In the context of graph-based flow builders, some known techniques use preconfigured templates to aid users in understanding and trying out various blocks of logic within a flow graph. The use of a template from a collection of templates, however, typically requires a user to properly identify the correct template for the flow logic the user is trying to build. Templates don't take in the context of an existing flow graph; thus a user will have to make subsequent changes to achieve the desired logic such as copy, pasting or modifying parameters on each node within the template.

Generative artificial intelligence (AI) is another solution that can receive a user prompt indicating a title and a description, and can build an entire flow graph from scratch. Known generative AI solutions, however, can only build flow graphs from scratch. These known solutions don't consider existing flow graphs as context, and thus cannot revise existing flow graphs. This limits users to just creating new flows and not expanding or enhancing existing flow graphs.

Thus, a need exists for improved techniques for generating a flow graph.

SUMMARY

In an embodiment, a representation of a first natural language prompt is received. A representation of the first natural language prompt is sent to a large language model (LLM) configured to identify a first pattern based on the first natural language prompt. A first main inlet associated with the first pattern at a graph, a first success outlet associated with the first pattern at the graph, and a first error outlet associated with the first pattern at the graph is determined based on the graph. A first modification is determined based on the first main inlet, the first success outlet, and the first error outlet. The graph is modified based on the first modification to generate a first modified graph.

BRIEF DESCRIPTION OF THE DRAWINGS

FIG. 7 shows a flowchart of a method to generate a graph and update the graph, according to an embodiment.

DETAILED DESCRIPTION

Figure 1:
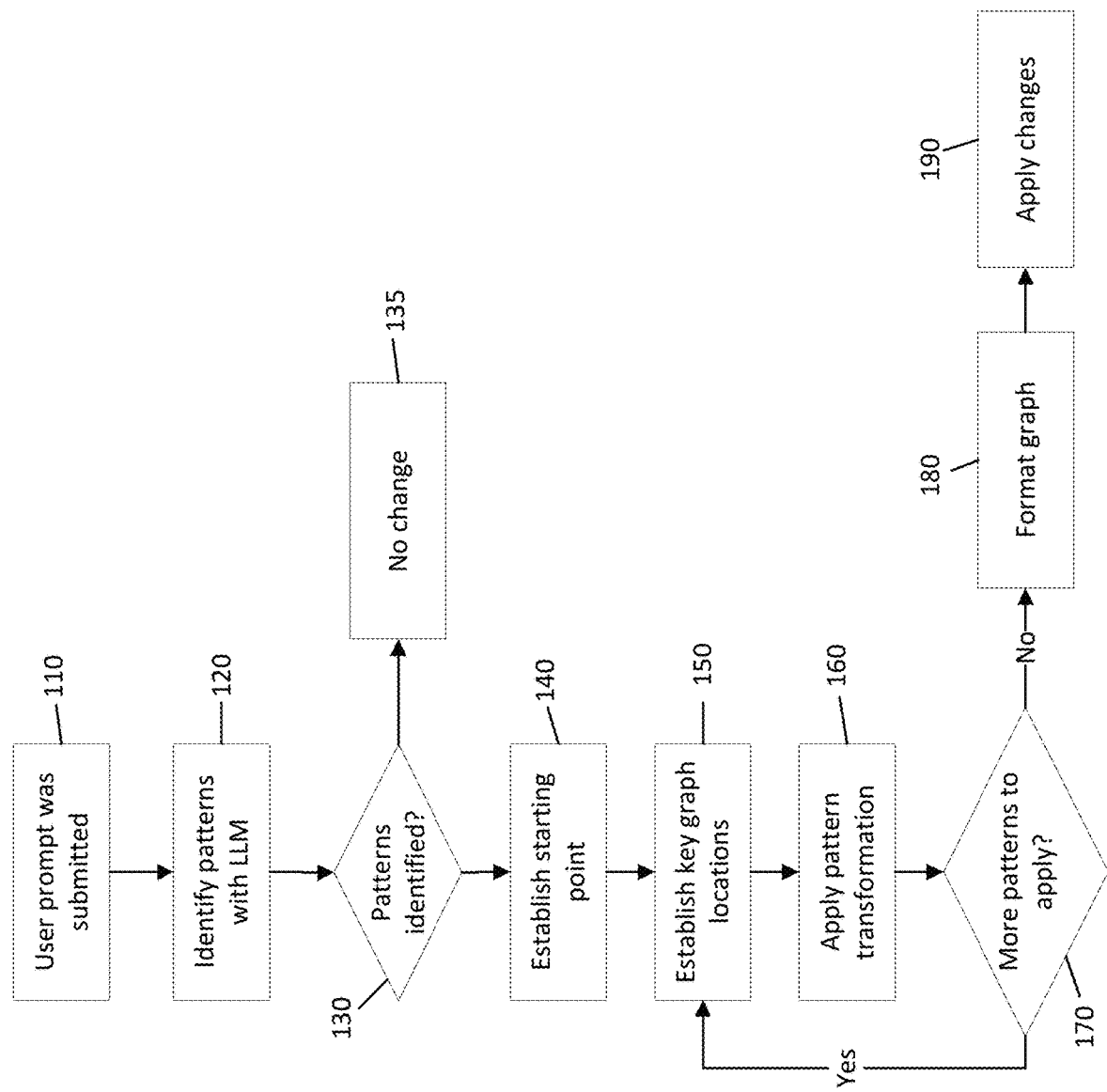
FIG. 1 is a flowchart for identifying patterns and recursively applying the identified patterns to a graph, according to an embodiment.

Some implementations are related to receiving a natural language prompt from a user, providing the natural language prompt to an LLM configured to identify patterns (if any) in the natural language prompt, and generating a graph and/or modifying an existing graph based on the identified patterns. This process can occur iteratively, and once the user doesn't have additional prompts, computer executable code can be generated based on the final graph(s). As a result, computer executable code can be generated by a user with little to no coding experience or interest (e.g., doesn't know how to code and/or doesn't want to code).

In some implementations, the term "pattern" refers to a type of request in a user prompt (sometimes referred to herein as "natural language prompt"). In some implementations, a "pattern" refers to the logic a user wants to replicate through a user prompt. A user prompt can include no patterns, one pattern, or multiple patterns. A pattern can include/represent useful information included in the user prompt (e.g., information that would cause or facilitate a graph to be modified or generated).

In some implementations, the term "template" refers to pre-designed, reusable frameworks or structures that provide a starting point for creating applications, workflows, or forms. Templates can include predefined components, action indicators, and/or configurations tailored to specific use cases, allowing users to build and customize their solutions without needing to start from scratch or write code. For example, a user may browse through available templates within a no-code or low-code platform and choose one that matches their requirements or desired outcome/solution. After selecting a template, the user may be able to customize the template.

In some implementations, the term "graph" (sometimes referred to herein as "flow structure" or "flow graph") refers to a graphical representation of a workflow or process where nodes (or vertices) and edges (or connections) illustrate the sequence and relationships between different steps or components of the workflow or process. Through the use of nodes and edges, the graph represents the flow or process in a simpler, more illustrative, and less technical way than code. Once a graph has been generated, the graph can be translated into executable programming logic. As such, even users that do not know how to code can generate a graph and have the graph translated into executable programming logic.

In some implementations, the term "subgraph" refers to a portion of a graph. For example, a graph can include a set of nodes and a set of edges, and a subgraph can refer to a subset of those nodes and/or a subset of those edges. Thus, in some implementations, "graph" represents an entire flow, while a "subgraph" is a subset of selected nodes and/or edges from the graph.

In some implementations, the term "no-code" refer to a development approach that allows users to build applications, workflows, or processes without writing any code. No-code platforms enable users with little to no technical expertise to design and deploy systems through a user-friendly graphical environment.

In some implementations, the term "low-code" refers to a development approach that simplifies application and workflow creation by providing a visual development environment alongside the option to write custom code. While low-code platforms reduce the amount of hand-coding required, they still allow for manual code additions to handle more complex requirements.

In one or more embodiments, a large language model (LLM) is used to disambiguate a user prompt and returns a representation of a set of patterns to the conversational flow graphical user interface (GUI). Those patterns are then applied on top of an existing flow to form an updated flow structure. If the user is satisfied with the updated flow structure, the user can select a predetermined button to confirm the updated flow structure (e.g., enter, save), which applies the newly generated. If the user is not satisfied with the updated flow structure, the user can provide additional prompts and the process of identifying patterns and updating the flow structure can continue until the user is satisfied.

In one or more embodiments, the productivity of conversational artificial intelligence (AI)-flow building is iteratively increased without requiring prior knowledge on how to build an effective working logical flow. For example, a graph can be generated and modified iteratively without using templates and/or the user coding. Said differently, a user does not need to use templates or create code to generate a conversational flow.

In one or more embodiments, a LLM is used to disambiguate a user's written prompt, describing the logic the user wants to replicate, into a set of patterns associated with (e.g., representing the underlying logic behind) the user's written prompt. In some implementations, those patterns are fed into the conversational flow graphical user interface (GUI) along with the context of the existing graph (e.g., metadata from the graph such as slot names, variable names, and/or the like). For example, for a graph with a first node that captures an email address, a user can type inside a search bar of the UI a prompt such as "make sure to not allow gmail addresses," "don't allow gmail addresses," "no gmail addresses allowed," "reject gmail addresses," and/or the like. In response, a new, second node is generated (without regenerating the first node) that checks the captured email against a regular expression (regex) that checks if the captured email is a gmail email account, such as "[^@]+@gmail\.com." Next the user selects the first and second nodes and types a prompt indicating how many retries are allowed, such as "allow 2 retries in case the email doesn't match," "two retries allowed if the email is not found," "no more than 2 attempts for mismatching emails," and/or the like. In response, a loop node (i.e., third node) with two maximum iterations is generated (without regenerating the first or second node), which connects to the node that captures the email (the first node). The node that validates the email address against the regex (the second node), will connect back into the loop node (third node) for a given invalid input (e.g., a gmail email address). Another node (fourth node) is generated (without regenerating the first, second, or third node) indicating to the user that the user has reached the maximum number of retries when the loop node (third node) reaches the maximum number of iterations. This example demonstrates the ability to quickly generate complex logic from natural language input and automatically adapt it to existing nodes and logic inside a graph. This allows for quick and easy contextual iteration over complex logic, without having to make edits to generated content; said differently, techniques described herein can produce a right/desired output quicker (e.g., the first time) compared to known techniques and without the user modifying the output. In some implementations, the context (graph metadata) is used to ensure that subsequent prompts apply to the right nodes and slots/variables. For instance, if there is a node for capturing an email ("EmailAddress" slot) and one prompt specifies that Gmail® addresses should not be allowed, a user can select the email capturing node and submit that prompt. Once a pattern is recognized, the pattern gets combined/incorporated with the context (metadata) of the node selected and uses the "EmailAddress" in the regex condition to restrict Gmail® addresses. Without that context, any random slot or no slot could be part of the regex condition and the user may instead have to provide extra clicks to fill in the correct information.

One or more embodiments described herein include the following various features:

LLM powered disambiguation: the use of a large language model to disambiguate a user prompt and identify a predefined set of patterns that apply.

Context aware pattern application: the ability to take the LLM output patterns and apply them on top of an existing graph while taking into account existing logic, without rendering the prior or new graph inoperative, without changing or losing the meaning or underlying logic of the prior or new graph.

Pattern chaining: the ability to identify and apply more than one pattern at the same time from a user prompt to an existing graph.

Some implementations provide a technical solution to a technical problem. For example, modifying a graph to incorporate a user prompt is more complex than generating a new graph because modifying (unlike starting from scratch) accounts for the current graph and existing context. Said differently, modification occurs without overly disturbing the underlying logic of the prior version of the graph, something that is not required for generating new graphs. Techniques described herein enable such modifications, for example, through incorporating user prompts iteratively instead of all at once and incorporating graph analysis to identify a main inlet, success inlet, and error inlet.

Some implementations allow users to generate no-code or low-code flows easier and more efficiently compared to known techniques. For some known techniques, a user typically must have knowledge of templates, what each template represents, and how templates can be used to generate flows; this requirement frequently prevents many users from being able to generate such flows. In contrast, techniques described herein don't use templates and thus enable more users to generate flows. For other known techniques, a user typically must provide a single user prompt that captures a desired flow in a manner that is detailed and comprehensive. Because the user cannot iteratively provide prompts to continuously modify a graph after the graph has been generated, the single user prompt typically must be nearly comprehensive (if not perfectly comprehensive). Otherwise, the user has to rewrite the entire prompt. In contrast, techniques described herein can modify existing graphs, so users can continuously provide user prompts.

In some implementations, techniques described herein are used by users who cannot code. As such, without implementing techniques described herein, those users typically cannot otherwise practically generate code to perform a desired process.

In some implementations, graphs are translated into computer executable code. Graphs can include a large amount of information, such as many nodes and many edges. The amount of information included in the graphs and considered to generate the computer executable code can be massive and reach levels that cannot be practically performed or considered by a human(s).

Some techniques described herein generate graphs quicker and more accurately compared to known techniques. Known techniques typically require a user to provide a single prompt to generate a graph, and cannot modify the graph thereafter. Therefore, if the single prompt is inaccurate, the graph doesn't capture the user's desired flow and the user re-writes the entire prompt. In contrast, techniques described herein can be modified iteratively; thus, a user can repeatedly modify and fine-tune a graph without having to repeatedly restart from scratch. This can result in a more efficient process of generating a graph, and a graph that is more in line with what the user desires.

Some implementations use an LLM. An LLM offers advantages in natural language that other types of known models do not. For example, in contrast to other known models, LLMs can understand and maintain context over lengthy prompts, which allows for more contextually relevant outputs.

Some implementations transform a graph. Compared to known techniques that can generate new graphs and not modify existing graphs, techniques described herein transform existing graphs to incorporate user prompts.

Some implementations iteratively input natural language prompts and/or system prompts to an LLM to generate patterns and modify graphs based on the patterns. In contrast, a human desiring to generate a graph would not need to, for example, use system prompts, input natural language prompts and/or system prompts iteratively, specifically use an LLM, and/or the like.

Figure 2:
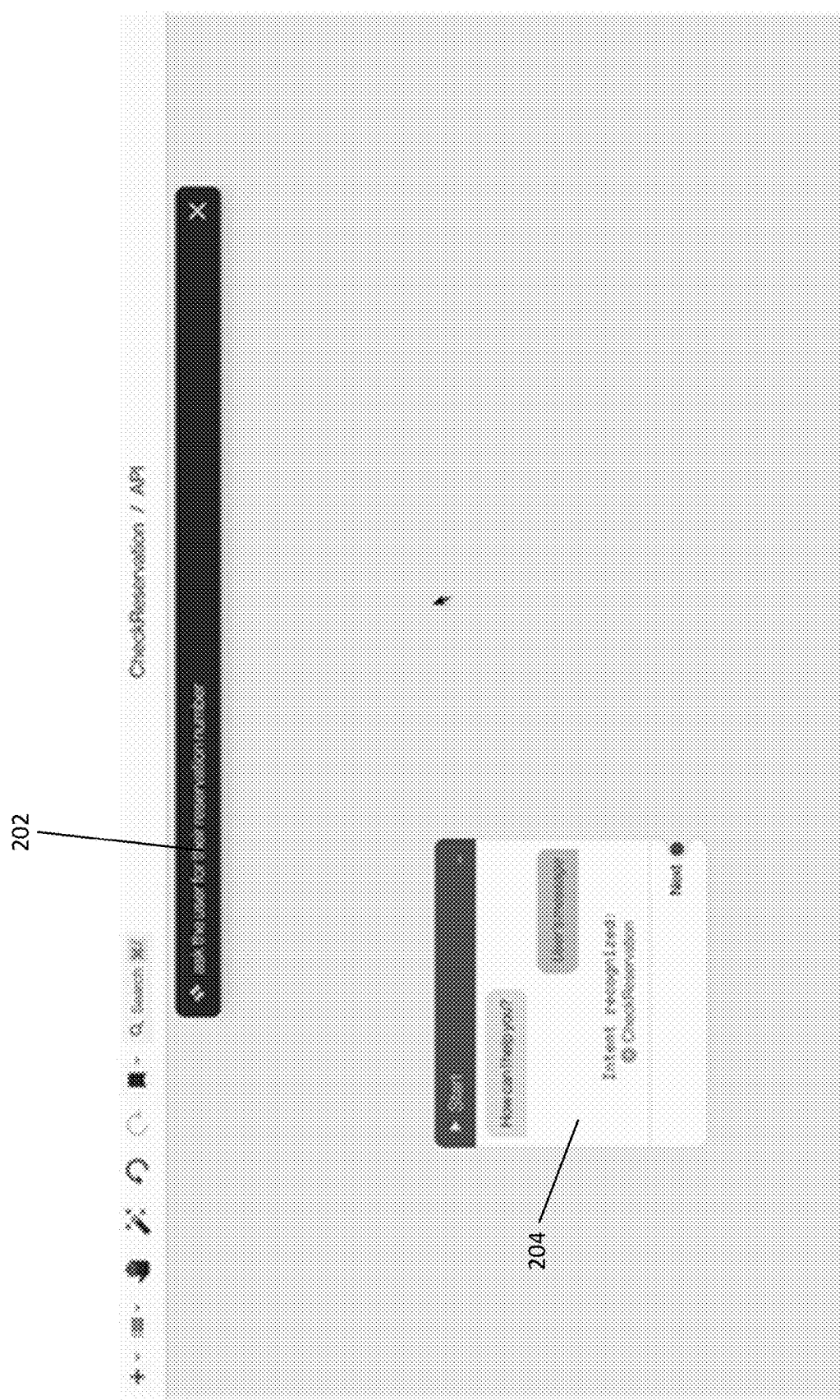
FIG. 2 shows a conversation flow graphical user interface (GUI), according to an embodiment.

FIG. 1 is a flowchart for identifying patterns and recursively applying the identified patterns to a graph, according to an embodiment. At 110, a user prompt (sometimes referred to herein as "natural language prompt") is submitted. For example, a user (e.g., user U at FIG. 4) can open a new window that displays the conversation flow graphical user interface (GUI) at their device (e.g., user compute device 440 at FIG. 4). The user can then click on a button in the GUI to enable/begin the prompt submission process (e.g., click a search bar button in the GUI followed by the space bar key that switches the graph search function to the graph generation function (similar/equivalent to a functional toggle)). In some implementations, where an existing graph is present, the user has two options: (1) enter a prompt without any part of the existing graph selected, or (2) enter a prompt with a subset of nodes from the graph being selected, which narrows down the context that is applicable to the node generation. In some implementations, only nodes are selectable by a user, and only if at least two user-selected nodes are connected via an edge(s) will that edge(s) be included in the user's selection. FIG. 2 shows an example of the former, where user prompt 202 has been entered ("ask the user for their reservation number") in the GUI without node 204 being selected.

Returning to FIG. 1, at 120, patterns are identified using an LLM. In some implementations, the user prompt is sent to a backend service (e.g., from user compute device 440 to graph compute device 400 via network 420 in FIG. 4), which sends a request to the LLM. In some implementations, the request contains the original user prompt received at 110 and/or a system prompt. The system prompt describes a list of patterns the model is allowed to recognize, such as: capturing a user's input such as an email, name, or ID; validating a user's input using a regular expression such as a valid email address, valid name, or valid ID; allowing the retry of one or more nodes that capture and/or validate a value using a loop with a maximum number of retries; and iterating over a specific list of items until a specific item is found such as "find the most expensive purchase from an itemized receipt." Each pattern listed in the system prompt has a code (e.g., identifier) assigned to it that represents that pattern. For example, the pattern to ask for a parameter from a user can be assigned code "a1" and the pattern of allowing retries can be assigned code "b1". Therefore, if the user prompt contains one or more patterns, the LLM returns a list of them; thus, the output of "ask for the user's email and allow 2 retries" from the LLM could be: "a1, b1". In some implementations, one or more patterns and/or codes listed in the system prompt are associated with (e.g., assigned) an optional pattern context definition. The pattern context definition describes additional parameters that the pattern identification requires. For example, the pattern code X requires a context parameter N (e.g., Pattern X=identifies retry logic; Context N: number of retries). If the LLM does not identify a pattern at 130, then no change to the graph occurs at 135. If the LLM identifies a pattern at 130, then the LLM response containing the set of patterns is sanitized and post-processed for the next stage of the process at 140. For example, if the LLM output contains a hallucination like a pattern that hasn't been defined, the pattern can be discarded (sanitization). In some implementations, the sanitized LLM output is then fitted into a new format and stored as a JSON object as part of the post-processing, which ensure the frontend application (e.g., user compute device 440) gets a valid response from the backend (e.g., graph compute device 400).

At 140, a starting point is established. Applying a pattern involves identifying a starting point, such as a part of the graph that the user explicitly selected using a node multiselect feature, a default node (e.g., the node last generated, the first node generated) included in the graph, a random node included in the graph, and/or the like. For example, if the user doesn't explicitly indicate the starting point, a random node or default node can be selected as the starting point. Specific pattern sequences, however, may mandate (e.g., via the pattern code and/or pattern context definition) that this selection is ignored and that the process starts from a new, empty graph.

In some implementations, if no nodes within the graph have been selected by a user and/or a pattern mandates starting from a new, empty graph, the patterns will generate an entirely new graph at 140. For example, the user prompt: "capture the user email and make sure it is a valid address" containing patterns a1 ("capture the user email") and b1 ("make sure it is a valid address") will generate a new graph that includes two nodes (rather than selecting a node from an existing graph): a 1st node for capturing the email is connected to a 2nd node for validating the captured email with a regular expression checking that the captured email is valid. In some implementations, a graph has at least one node and generating a new graph includes generating at least one node that does not connect to pre-existing graphs.

Figure 3:
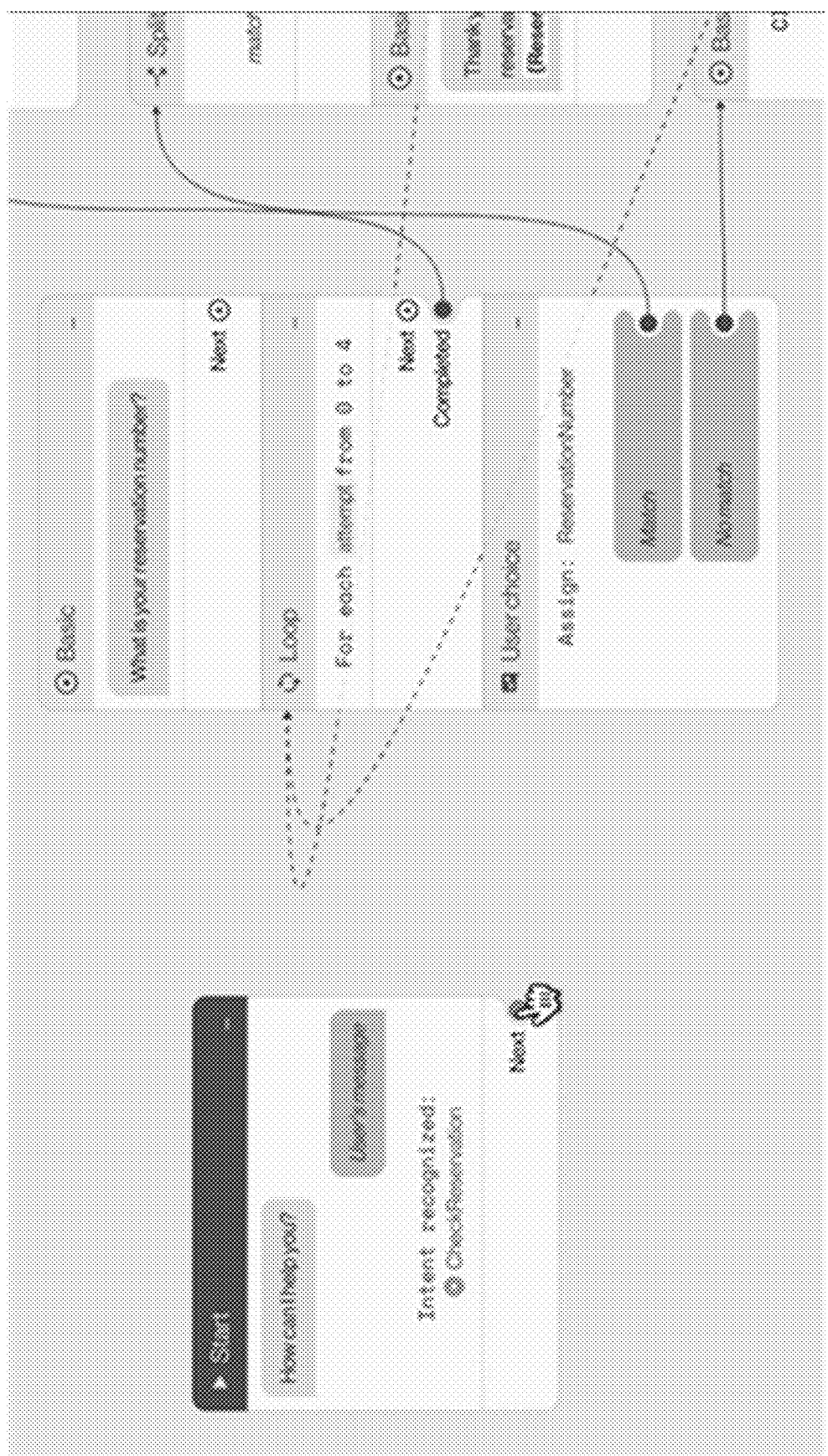
FIG. 3 shows a conversation flow GUI with a loop, according to an embodiment.

In some implementations, if nodes within a graph have been selected, at 140, the patterns can connect to the existing graph to create more logically sound flow. In some implementations, creating a more logically sounding flow is a deterministic process. For example, the process takes as input the LLM identified patterns and the selected nodes. The pattern is applied to the selected group of nodes based on the identifying the main inlet, success outlet and error outlet of the subgraph. Bad flows that may generate errors or infinite loops are restricted by running (e.g., at graph compute device 400) through a validator that checks for errors and exceptions (a logically sound flow shouldn't trigger any of those issues). For example, if the graph that was capturing and validating an email is selected and the user prompt is "retry it 3 times," a looping node is added with an additional node(s) for three failures. That new node(s) will connect properly to the previously selected nodes such that the resulting logic achieves a valid flow. FIG. 3 shows an example of a conversation flow GUI with a loop automatically generated after a user prompt of "the user may retry the number 5 times."

In some implementations, whether the starting point is an existing graph or a new graph the pattern application follows a deterministic algorithm. After the starting point is determined, the first stage in applying a pattern at 150 involves establishing key graph locations: (1) the main inlet: the point at which the majority of conversations will reach the graph in question, (2) the success outlet: the point at which the conversation will most likely leave the graph in the success scenario, and (3) the error outlet: the point at which the conversation will most likely leave the graph in the error scenario.

To determine (or establish) each of these locations, each node in the graph is evaluated based on specific criteria. For example, a node is a strong candidate for main inlet if: (1) the node does not have incoming connections from other nodes in the graph (outside incoming connections are not relevant), and (2) the node type or configuration indicates (e.g., through the pattern code) the success path of the graph (e.g., an escalation node would be passed on as main inlet in favor of a user input node). In some implementations, where there are multiple strong candidates, the first strong candidate identified is chosen for main inlet. In some implementations, an escalation node is used to interrupt the conversation with a bot and connect the user to a human agent whether through chat or voice. In some implementations, the lower the number of incoming connections from within a graph or subgraph a node has (e.g., ideally zero), the more likely that node is a main inlet.

In some implementations, any node on the graph has at most one inlet where one or more incoming edges can connect. If a node has no incoming edge through its main inlet, that node will never be traversed. In the case of a pattern being applied to a selected group of nodes, the main inlet is identified as the inlet of the first node in the selected group of nodes.

In some implementations, the success outlet is identified based on the type of the node. For example, if a selected subgraph is one node consisting of capturing an email address, the outlets of that node are "match" (success outlet) and "no match." A match might be any string that matches the format of an email while "no match" is everything else. The error outlet could be the "no match" outlet. In the case of a different node such as an action node that triggers an API request, the error outlet is called "Error" and is traversed when the API request fails.

At 160, pattern transformations are applied. Each transformation step at 160 defines a specific sequence of modifications on the graph(s), such as inserting a loop node between the main inlet and its incoming connections from outside the graph(s). Once the modifications are done, all newly inserted nodes become part of the new graph.

At 170, a determination is made as to whether there are more patterns to apply (e.g., whether any patterns identified at 120 have not yet been applied). If so, the process returns to 150 and repeats with the new graph (generated at 160) until there are no more patterns to apply.

At 180 and 190, the final graph is re-formatted using a layout algorithm, such as the Dagre graph layout algorithm. This layout algorithm is configured to improve graph readability by, for example, reducing edge crossings and ensuring consistent spacings when possible. The layout algorithm maintains all connections (edges) between the nodes, and is modified to maintain the geometric center of the original and re-formatted graphs.

One or more embodiments can be used, for example, by conversation builders inside a conversational AI GUI. Because one or more embodiments are agnostic of the field of the conversation flow being built, such one or more embodiments can be applied to any industry application such as banking, insurance, travel, hospitality, tech support, e-commerce, etc.

One or more embodiments have several benefits over known systems. For example, the time it takes to add complex repetitive logic such as retry mechanisms can be reduced. Some patterns can add more than two nodes and make more than three connections between nodes. In other words, each single given typed prompt can achieve the same result faster and more reliably than would be case if performed manually or by known AI techniques.

One or more embodiments also allow iterative improvements versus a single prompt that is unlikely to capture and generate a working output that fits the user's request. For instance, it is possible that a high-level prompt submitted to a generative AI text model will yield an imperfect output given the prompt's generality. If such, this process can lead to quite a bit of rework and rephrasing, whereas an iterative approach such as that described herein is more focused and yields better results in practice (because the generative AI doesn't have to make up for a lot of details that might not be present in a single prompt).

One or more embodiments also educate the user on best practices as the patterns being identified and applied represent well established implementation of common or complex logic. For example, as a user uses techniques described herein more, the user will become more familiar with the look and logic flow of effective graphs. A user may be entirely unfamiliar with logic flow initially, but will see some provided examples and learn over time.

One or more embodiments can take a graph as context and reliably apply LLM-identified patterns in a deterministic way that preserves existing functionality while adding additional logic. As long as a defined pattern is being identified, the domain of the logic being represented as a graph should not impact the generation of the graph.

Figure 4:
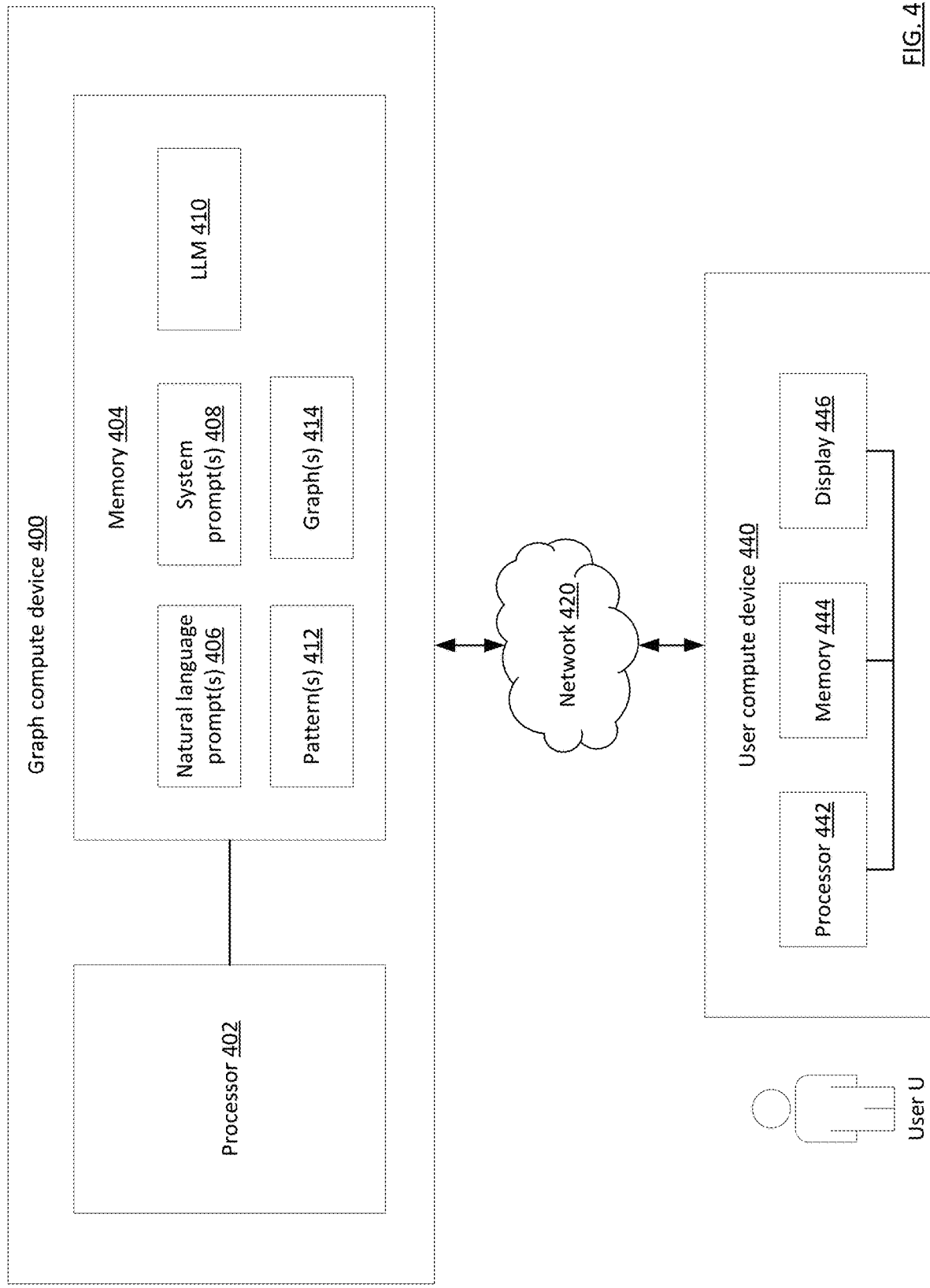
FIG. 4 illustrates a system block diagram to generate and update one or more graphs, according to an embodiment.

FIG. 4 illustrates a system block diagram to generate and update one or more graphs, according to an embodiment. FIG. 4 includes graph compute device 400 communicably coupled to user compute device 440 via network 420.

Network 420 can be any suitable communications network for transferring data, operating over public and/or private networks. For example, network 420 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 420 can be a wireless network such as, for example, a Wi-Fi or wireless local area network ("WLAN"), a wireless wide area network ("WWAN"), and/or a cellular network. In other instances, network 420 can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via network 420 can be encrypted or unencrypted. In some instances, the network 420 can include multiple networks or subnetworks operatively coupled to one another by, for example, network bridges, routers, switches, gateways and/or the like (not shown).

In some implementations, graph compute device 400 and/or user compute device 440 is a server, desktop, laptop, tablet, mobile device, and/or the like. Graph compute device 400 includes processor 402 operatively coupled to memory 404 (e.g., via a system bus). User compute device includes processor 442, memory 444, and display 446, each operatively coupled to one another (e.g., via a system bus).

Processors 402 and/or 442 can be, for example, a hardware based integrated circuit (IC), or any other suitable processing device configured to run and/or execute a set of instructions or code. For example, processors 402 and/or 442 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processors 402 and/or 442 can be configured to run any of the methods and/or portions of methods discussed herein.

Memories 404 and/or 444 can be, for example, a random-access memory (RAM), a memory buffer, a hard drive, a read-only memory (ROM), an erasable programmable read-only memory (EPROM), and/or the like. In some instances, memories 404 and/or 444 can store, for example, one or more software programs and/or code that can include instructions to cause processors 402 and/or 442, respectively, to perform one or more processes, functions, and/or the like. In some implementations, memories 404 and/or 444 can include extendable storage units that can be added and used incrementally. In some implementations, memories 404 and/or 444 can be portable memories (e.g., a flash drive, a portable hard disk, and/or the like) that can be operatively coupled to processors 402 and/or 442, respectively. In some instances, memories 404 and/or 444 can be remotely operatively coupled with a compute device (not shown).

Display 446 can any type of display, such as a CRT (Cathode Ray tube) display, LCD (Liquid Crystal Display) display, LED (Liquid Emitting Diode) display, OLED (Organic Light Emitting Diode) display, and/or the like. Display 446 can be used to display a GUI.

Memory 404 includes (e.g., stores) a representation of natural language prompt(s) 406, system prompt(s) 408, LLM 410, pattern(s) 412, and graph(s) 414. Natural language prompt(s) 406 represents one or more natural language prompts. Natural language prompt(s) 406 is in natural language and a not programming language (e.g., C++, Java, Python, SQL, MATLAB, etc.); in some implementations, a programming language has a strict and rigorous syntax and semantics that must be followed to avoid errors or bugs while natural languages have a loose and flexible syntax and semantics that allow for creativity and variation. An example of natural language prompt(s) 406 is user prompt 202 in FIG. 2. In some implementations, natural language prompt(s) 406 is within a word or character limit, which promotes providing shorter natural language prompts iteratively rather than one lengthy prompt.

In some implementations, user U uses compute device 440 to access a GUI displayed via display 446 and provide a representation of natural language prompt(s) 406. For example, user U can type natural language prompt(s) 406 into the GUI. After natural language prompt(s) 406 has been written, a representation of natural language prompt(s) 406 can be sent from user compute device 440 to graph compute device 400 via network 420.

Natural language prompt(s) 406 can be input into LLM 410 to generate pattern(s) 412. LLM 410 can include one model, multiple separate models, chained LLMs, and/or the like. LLM 410 can be configured to identify what, if any, patterns are included in natural language prompt(s) 406. For example, in some implementations, LLM 410 includes a first LLM configured to detect retry request patterns, a second LLM configured to detect patterns that request more information from users, a third LLM configured to detect date or time patterns, and/or the like. As another example, in some implementations, LLM 410 includes a single model configured to detect multiple different patterns simultaneously.

LLM 410 can be trained using training data. For example, LLM 410 can be trained using natural language prompts as input learning data and patterns identified (or the lack of patterns identified) from those natural language prompts as target learning data. In some implementations, a first portion of the training data is used to train LLM 410, a second portion of the training data is used to test LLM 410, and a third portion of the training data is used to validate LLM 410, resulting in a more accurate and better trained model. In some implementations, an initial set of training data can be provided and the initial set of training data can be augmented (e.g., synonym replacement, spelling changes, punctuation changes, more or less words, etc.) to generate a synthetic set of training data; the initial set and synthetic set can then both be used to train LLM 410, resulting in a more accurate and better trained model. In some implementations, even after LLM 410 has been deployed, trained, tested, and/or validated, output produced by LLM 410 (e.g., pattern(s) 412) can be used to re-train LLM 410, resulting in a continuous feedback training loop.

System prompt(s) 408 represents a list of patterns LLM 410 is allowed to recognize and output. Said differently, in response to LLM 410 receiving a natural language prompt as input, system prompt(s) 408 represents patterns that LLM 410 is allowed to output. Accordingly, pattern(s) 412 generated by LLM 410 is included in system prompt(s) 408. Each pattern listed in system prompt(s) 408 has a code assigned to it that represents that pattern. For example, a pattern that identifies retry logic is associated with a first code, a pattern that identifies user information request information logic is associated with a second code, a pattern that identifies time and date logic is associated with a third code, and/or the like. Additionally or alternatively, in some implementations, one of more patterns listed in system prompt(s) 408 is associated with a pattern context definition (though not all patterns need to be associated with a pattern context definition). For a pattern that is associated with a pattern context definition, the pattern context definition can define additional parameters the pattern requires and/or can request. For example, if the pattern is associated with retries, the pattern context definition can define that a number of retries can/should be defined. As another example, if the pattern is associated with blocking calls, the pattern context definition can define which phone numbers can/should be blocked.

System prompt(s) 408 can be generated at graph compute device 400 and/or generated at a different compute device (e.g., user compute device 440, a compute device not shown in FIG. 4) and received at graph compute device 400 (e.g., via network 420, via a flash drive, etc.).

In some implementations, system prompt(s) 408 is input into LLM 410, along with natural language prompt(s) 406, to generate pattern(s) 412. Thus, in some implementations, training LLM 410 further includes using system prompts as input learning data (though in other implementations LLM 410 is trained without using a system prompt).

Graph(s) 414 can include one or more graphs and represent a flow generated by one or more of the no-code/low-code techniques discussed herein. Graph(s) 414 can include one or more nodes, such as trigger nodes initiating the workflow (e.g., form submission or event), action nodes performing specific actions (e.g., send email, update database, generate report, etc.), condition nodes including decision points, data nodes managing data operation (e.g., write to or read from a database), integration nodes connecting with external services or application programing interfaces (APIs), custom code nodes allowing users to insert and execute custom code, and/or the like. The one or more nodes can be connected with edges, where the edges can indicate relationships between nodes. In some implementations, graph(s) 414 is or includes a directed acyclic graph (DAG), which can be used (e.g., reformatted) with a Dagre graph layout algorithm.

Pattern(s) 412 can be used to generate and/or modify graph(s) 414. For example, a first pattern in pattern(s) 412 can generate a first graph included in graph(s) 414, a second pattern in pattern(s) 412 can be used to modify the first graph to generate a second graph, a third pattern in pattern(s) 412 can be used to modify the second graph to generate a third graph, a fourth pattern in pattern(s) 412 can be used to generate a separate graph, and/or the like. In some implementations, graph(s) 414 is generated and/or updated at a no-code user interface without writing code and without using a template.

Modifying an existing graph to incorporate a pattern can include determining a modification. A modification can be determined based on (1) a starting point identified based on the pattern and/or input by user U and/or (2) a main inlet identified based on the pattern, a success inlet identified based on the pattern, and an error inlet identified based on the pattern at the existing graph. The existing graph can then be updated to incorporate the modification.

In some implementations, in addition to providing natural language prompt(s) 406 used to identify (e.g., generate, recognize, extract) pattern(s) 412, user U can provide an indication of a portion of graph(s) 414 (e.g., one or more nodes and/or edges) that natural language prompt(s) 406 is to apply to. For example, user U may select at user compute device 440 a subset of nodes and edges at graph(s) 414 for checking an email address and, if natural language prompt(s) 406 says "allow five retries," the subset of nodes and edges for checking the email address will be modified to allow five retries but other nodes and edges at graph(s) 414 will not be modified. Therefore, in some implementations, determining a modification to be made and/or identifying the starting point, main inlet, success inlet, and/or error inlet can be based on user U's selection of nodes and/or edges at graph(s) 414.

In some implementations, in response to receiving natural language prompt(s) 406 as input, LLM 410 does not identify any patterns in natural language prompt(s) 406. In such a case, graph(s) 415 is not modified.

The aforementioned process of receiving natural language prompts and/or system prompts, generating patterns using an LLM, and generating or updating a graph based on the patterns can be performed iteratively/serially as additional natural language prompts are received. In other words, graphs can be generated and/or updated iteratively as additional natural langue prompts are received. For example, a graph can be generated in response a first natural language prompt received at a first time, the graph can be modified to generate a modified graph in response to a second natural language prompt received at a second time after the first time, the modified graph can be modified in response to a third natural language prompt received at a third time after the second time, and so on. Additionally or alternatively, in some implementations, a single natural language prompt can include multiple patterns; those patterns can be applied to modify and/or generate a graph at the same time and/or at different times.

Graph compute device 400 can receive any number of natural language prompts to generate and/or modify any number of graphs. Eventually, however, user U may determine that the graph(s) is complete and ready to be deployed. Thus, if the graph(s) 414 is complete and ready to be deployed, graph(s) 414 can be stored in a JSON format/as a JSON object. Executable programming logic (sometimes referred to herein as "computer executable code") can then be created (generated) based on graph(s) 414. In some implementations, nodes are mapped to programming constructs such as statements, conditionals, and loops while edges determine the control flow and are translated into sequential execution, branching, or looping structures in code. For example, input/output nodes can be converted into data entry or output operations (e.g., "System.out.println ("Result: "+result)), process nodes can be converted to statements or functions (e.g., "int sum=a+b"), decision nodes can be converted to conditional statements like "if", "else," or "switch" (e.g., if (age >18)), and loop nodes can be converted to loops constructs like "for," "while," or "do-while" (e.g., for (int i=1; I<=n; i++). As another example, edges of graph(s) 414 can represent sequential flow (e.g., edges flow from Node A to Node B to Node C and so forth), and code statements can be placed in the same flow (e.g., operation of Node A performed first, operation of Node B performed second, operation of Node C performed third, etc.). Thereafter, the code can be stored and/or executed (e.g., at user compute device 440, at graph compute device 400, at a compute device not shown in FIG. 1). In some implementations, after graph(s) 414 has been finalized, graph(s) 414 can be displayed at user compute device 440 via a no-code user interface or low-code user interface (e.g., as shown in FIG. 2 or 3). In some implementations, the computer executable code generated based on the completed graph(s) can be executed (e.g., at graph compute device 400 and/or user compute device 440). For example, in response to the computer executable code being run, a set of user inputs can be requested and received (e.g., via a no- or low-code user interface), and, in accordance with the compute executable code, a set of response to the set of user inputs generated based on the computer executable code/graph(s) 414.

To provide an example, a graph may be generated that includes a first node requesting from a user a reservation number, a first edge that connects the first node to a second node that checks that the reservation number is at least eight alphanumeric characters, and a second edge that connects from the second node to a third node that allows up to five retries. Executable programming logic can be generated (e.g., without the user writing code) based on the graph and be executed (e.g., at time the executable programming logic is generated or at a later time). From the user's perspective, the user is first asked to provide a reservation number. If the reservation number is less than eight alphanumeric characters, an error message is produced. If an error is identified, then the user can retry entering a reservation number up to five times, each time checking whether the input reservation number is at least eight alphanumeric characters. If, within those five attempts, a reservation number that is not less than eight alphanumeric characters is provided by the user, a success message is produced.

In some implementations, graph(s) 414 can be reformatted. The reformatting can occur at any time, such as before all nodes and edges of graph(s) 414 have been generated and/or after all nodes and edges of graph(s) 414 have been generated. Reformatting can include, for example, changing a placement of nodes and/or edges to reduce the number of edges crossing; said differently, graph(s) 414 can include a number of edges that are crossing over each other before reformatting and after reformatting the number of crossing edges can be reduced.

Although FIG. 4 illustrates one example, variations can exist. For example, in some implementations, the functionalities of graph compute device 400 and user compute device 440 can be combined. In such case, the same compute device that receives a natural language prompt from user U can identify patterns using an LLM, modify graphs, and display graphs. As another example, in some implementations, the functionalities of graph compute device 400 and user compute device 440 can be delegated to other compute devices; for example, LLM 410 can be stored a compute device not shown in FIG. 4 and communicate with graph compute device 400 via network 420.

Figure 5:
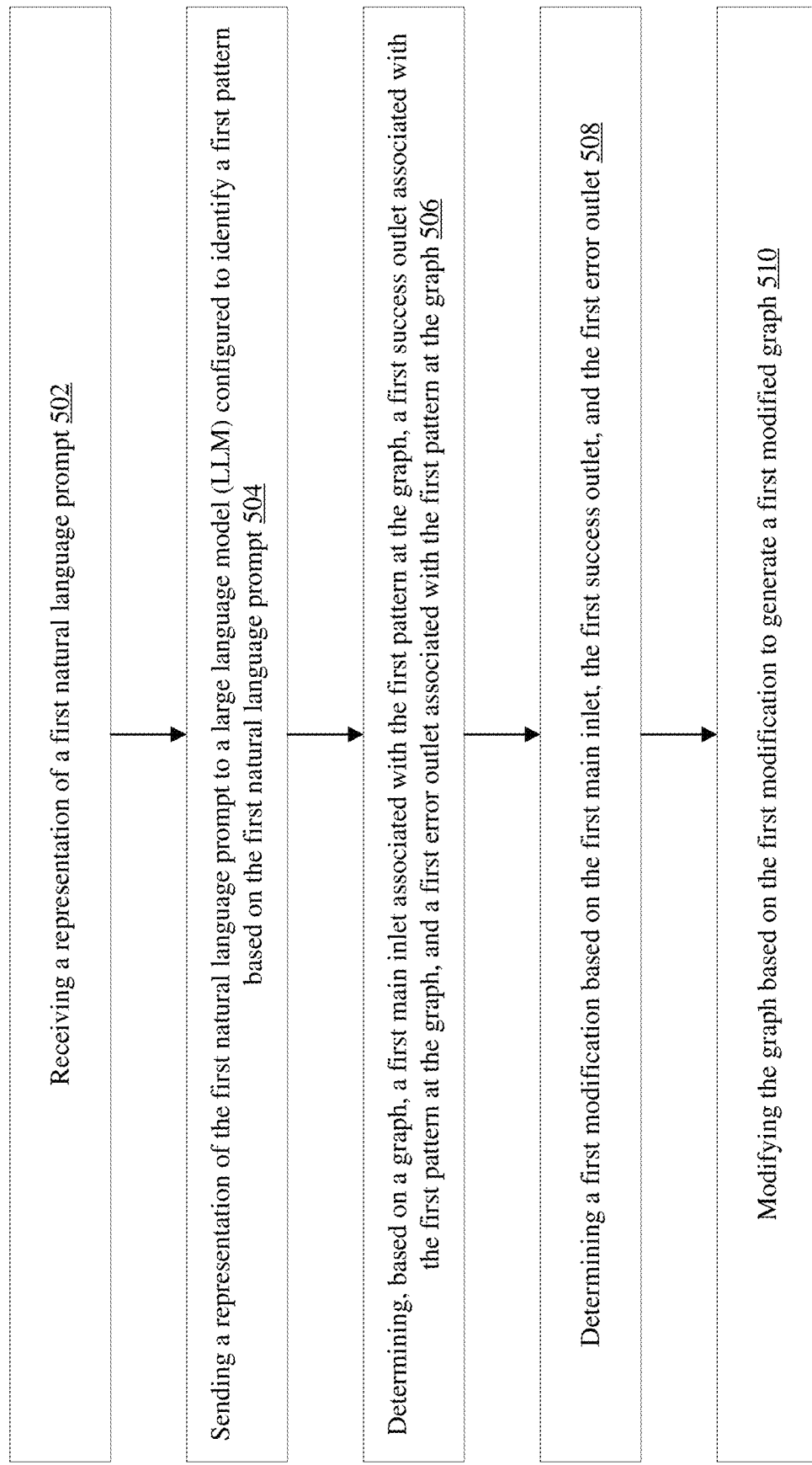
FIG. 5 shows a flowchart of a method to modify a graph in response to receiving a natural language prompt, according to an embodiment.

FIG. 5 shows a flowchart of a method 500 to modify a graph in response to receiving a natural language prompt, according to an embodiment. In some implementations, method 500 is performed by a processor (e.g., processor 402).

At 502, a representation of a first natural language prompt (e.g., included in natural language prompt(s) 406) is received. For example, the first natural language prompt can be received at graph compute device 400 from user compute device 440 via network 420, or graph compute device 400 can receive the first natural language prompt from a flash drive.

At 504, a representation of the first natural language prompt is sent to a LLM (e.g., LLM 410) configured to identify a first pattern (e.g., included in pattern(s) 412) based on the first natural language prompt. In some implementations, 504 occurs automatically (e.g., without human intervention) in response to 502.

At 506, a first main inlet associated with the first pattern at a graph (e.g., graph(s) 414), a first success outlet associated with the first pattern at the graph, and a first error outlet associated with the first pattern at the graph is determined based on the graph. In some implementations, 506 occurs automatically (e.g., without human intervention) in response to 504.

At 508, a first modification is determined based on the first main inlet, the first success outlet, and the first error outlet. In some implementations, 508 occurs automatically (e.g., without human intervention) in response to 506.

At 510, the graph is modified based on the first modification to generate a first modified graph (e.g., modified graph(s) 414). In some implementations, 510 occurs automatically (e.g., without human intervention) in response to 508.

In some implementations of method 500, the first natural language prompt is received from a compute device (e.g., user compute device 440). Method 500 can further include causing the first modified graph to be displayed (e.g., using display 446) via at least one of a no-code user interface at the compute device or a low-code user interface at the compute device. For example, graph compute device 400 can send an electronic signal to user compute device 440 representing the first modified graph, and user compute device 440 can be configured to display the first modified graph in response to receiving the electronic signal.

Some implementations of method 500 further include receiving a representation of a second natural language prompt (e.g., included in natural language prompt(s) 406). Some implementations of method 500 further include sending a representation of the second natural language prompt to the LLM configured to identify a second pattern (e.g., included in pattern(s) 412) based on the second natural language prompt. Some implementations of method 500 further include determining, based on the first modified graph and not based on the graph, a second main inlet associated with the second pattern at the first modified graph, a second success outlet associated with the second pattern at the first modified graph, and a second error outlet associated with the second pattern at the first modified graph. Some implementations of method 500 further include determining a second modification based on the second main inlet, the second success outlet, and the second error outlet. Some implementations of method 500 further include modifying the first modified graph and not the graph based on the second modification to generate a second modified graph.

In some implementations of method 500, the LLM is further configured to identify a second pattern (e.g., included in pattern(s) 412) based on the first natural language prompt. Some implementations of method 500 further include determining, using the first modified graph, a second main inlet associated with the second pattern at the first modified graph, a second success outlet associated with the second pattern at the first modified graph, and a second error outlet associated with the second pattern at the first modified graph. Some implementations of method 500 further include determining a second modification based on the second main inlet, the second success outlet, and the second error outlet. Some implementations of method 500 further include modifying the first modified graph based on the second modification to generate a second modified graph.

In some implementations of method 500, the LLM is further configured to identify a second pattern (e.g., included in pattern(s) 412) based on the first natural language prompt. Some implementations of method 500 further include determining, using the graph, a second main inlet associated with the second pattern at the graph, a second success outlet associated with the second pattern at the graph, and a second error outlet associated with the second pattern at the graph. Some implementations of method 500 further include determining a second modification based on the second main inlet, the second success outlet, and the second error outlet, where the modifying of the graph to generate the first modified graph at 510 is further based on the second modification.

In some implementations of method 500, the graph includes a plurality of nodes. Some implementations of method 500 further include receiving an indication of a set of nodes from the plurality of nodes selected by a user (e.g., user U), where the first modification is further determined based on the set of nodes at 508.

Some implementations of method 500 further include receiving a representation of a second natural language prompt (e.g., included in natural language prompt(s) 406). Some implementations of method 500 further include sending a representation of the second natural language prompt to the LLM. The LLM is configured to generate an output indicating that the second natural language prompt does not include any patterns. Some implementations of method 500 further include refraining, in response to generating the output indicating that the second natural language prompt does not include any patterns, from modifying at least one of the graph or the first modified graph.

Figure 6:
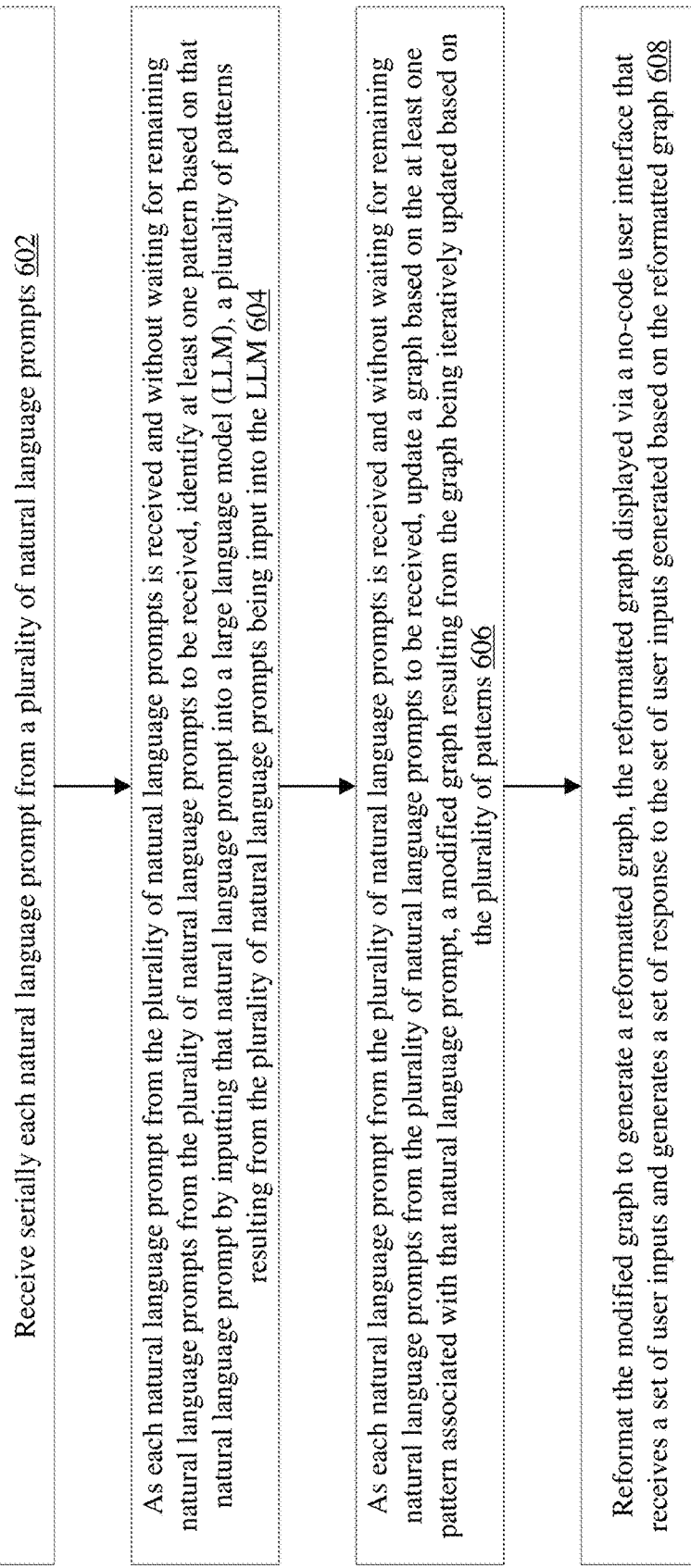
FIG. 6 shows a flowchart of a method to iteratively modify a graph in response to receiving a natural language prompt, according to an embodiment.

FIG. 6 shows a flowchart of a method 600 to iteratively modify a graph in response to receiving a natural language prompt, according to an embodiment. In some implementations, method 600 is performed by a processor (e.g., processor 402).

At 602, each natural language prompt from a plurality of natural language prompts (e.g., natural language prompt(s) 406) is received serially. For example, a first natural language prompt is received at a first time, a second natural language prompt is received at a second time after the first time, and so on.

At 604, as each natural language prompt from the plurality of natural language prompts is received and without waiting for remaining natural language prompts from the plurality of natural language prompts to be received, at least one pattern (e.g., included in pattern(s) 412) is identified based on that natural language prompt by inputting that natural language prompt into a large language model (LLM) (e.g., LLM 410). A plurality of patterns (e.g., included in pattern(s) 412) result from the plurality of natural language prompts being input into the LLM.

At 606, as each natural language prompt from the plurality of natural language prompts is received and without waiting for remaining natural language prompts from the plurality of natural language prompts to be received, a graph (e.g., graph(s) 414) is updated based on the at least one pattern associated with that natural language prompt. A modified graph results from the graph being iteratively updated based on the plurality of patterns.

At 608, the modified graph is reformatted to generate a reformatted graph. The reformatted graph is displayed via a no-code user interface (e.g., at user compute device 440). For example, after graph compute device 400 generates the reformatted graph, a representation of the reformatted graph is sent to user compute device 440 for display via a no-code user interface. A set of user inputs are received via the no-code user interface (e.g., at user compute device 440 from user U; at graph compute device 400) and a set of responses to the set of user inputs are generated based on the reformatted graph (e.g., at user compute device 440; at graph compute device 400).

In some implementations of method 600, at least one natural language prompt from the plurality of natural language prompts is received without receiving an indication of at least one node selected by a user (e.g., user U) and included in the graph.

In some implementations of method 600, the modified graph includes a first number of edge crossings and the reformatted graph includes a second number of edge crossings that is less than the first number of edge crossings.

In some implementations of method 600, the plurality of natural language prompts is received from a remote compute device (e.g., user compute device 440) and method 600 further includes causing the reformatted graph to be displayed (e.g., via display 446) at the remote compute device.

FIG. 7 shows a flowchart of a method 700 to generate a graph and update the graph, according to an embodiment. In some implementations, method 700 is performed by a processor (e.g., processor 402).

At 702, a first natural language prompt (e.g., included in natural language prompt(s) 406) is received. At 704, the first natural language prompt is input into a large language model (LLM) (e.g., LLM 410) to identify a first pattern. In some implementations, 704 occurs automatically (e.g., without human intervention) in response to 702. At 706, a graph (e.g., graph(s) 414) is generated based the first pattern and at a no-code user interface, where the graph represents a first conversation flow. The graph can be a new graph and not a modification of an existing graph. In some implementations, 706 occurs automatically (e.g., without human intervention) in response to 704.

At 708, a second natural language prompt (e.g., included in natural language prompt(s) 406) is received that includes a representation of a desired modification to the first conversation flow. At 710, the second natural language prompt is input into the LLM to identify a second pattern. In some implementations, 710 occurs automatically (e.g., without human intervention) in response to 708. At 712, the graph is updated, at the no-code user interface, based the second pattern and without generating a new graph, to generate a modified graph that represents a second conversation flow that incorporates the desired modification to the first conversation flow.

In some implementations of method 700, the graph is a first graph. Some implementations of method 700 further include receiving a third natural language prompt (e.g., included in natural language prompt(s) 406). Some implementations of method 700 further include inputting the third natural language prompt into the LLM to identify a third pattern (e.g., included in pattern(s) 412). Some implementations of method 700 generating a second graph that is new and not a modified version of the first graph based the third pattern. In some implementations of method 700, the third natural language prompt is received without receiving an indication of any nodes included in the modified graph that have been selected by a user.

Some implementations of method 700 further include receiving an indication of at least one node included in the graph and selected by a user (e.g., user U), the modified graph further generated at 712 based on the at least one node.

Some implementations of method 700 further include determining a main inlet, a success outlet, and an error outlet at the graph, the modified graph further generated at 712 based on the main inlet, the success outlet, and the error outlet.

Some implementations of method 700 further include receiving a third natural language prompt (e.g., included in natural language prompt(s) 406), inputting the third natural language prompt into the LLM to generate an output that indicates the third natural language prompt does not include any patterns, and in response to generating the output, refraining from updating at least one of the graph or the modified graph.

Some implementations of method 700 further include establishing a starting point at the graph, the modified graph further generated at 712 based on the starting point.

In some implementations of method 700, the graph is generated and updated at the no-code user interface without writing code and without using a template.

In some implementations of method 700, the first pattern is associated with a pattern context definition indicating at least one parameter the first pattern requires.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
receiving, via a processor, a representation of a first natural language prompt;
sending, via the processor, a representation of the first natural language prompt to a large language model (LLM) configured to identify a first pattern based on the first natural language prompt;
determining, via the processor and based on a graph, a first main inlet associated with the first pattern at the graph, a first success outlet associated with the first pattern at the graph, and a first error outlet associated with the first pattern at the graph;

determining a first modification based on the first main inlet, the first success outlet, and the first error outlet; and modifying the graph based on the first modification to generate a first modified graph.

2. The method of claim 1, wherein the first natural language prompt is received from a compute device, the method further comprising:

causing the first modified graph to be displayed via at least one of a no-code user interface at the compute device or a low-code user interface at the compute device.

3. The method of claim 1, further comprising:

receiving, via the processor, a representation of a second natural language prompt;

sending, via the processor, a representation of the second natural language prompt to the LLM configured to identify a second pattern based on the second natural language prompt;

determining, via the processor, based on the first modified graph and not based on the graph, a second main inlet associated with the second pattern at the first modified graph, a second success outlet associated with the second pattern at the first modified graph, and a second error outlet associated with the second pattern at the first modified graph;

determining, via the processor, a second modification based on the second main inlet, the second success outlet, and the second error outlet; and modifying, via the processor, the first modified graph and not the graph based on the second modification to generate a second modified graph.

4. The method of claim 1, wherein the LLM is further configured to identify a second pattern based on the first natural language prompt, the method further comprising:

determining, using the first modified graph, a second main inlet associated with the second pattern at the first modified graph, a second success outlet associated with the second pattern at the first modified graph, and a second error outlet associated with the second pattern at the first modified graph;

determining a second modification based on the second main inlet, the second success outlet, and the second error outlet; and modifying the first modified graph based on the second modification to generate a second modified graph.

5. The method of claim 1, wherein the LLM is further configured to identify a second pattern based on the first natural language prompt, the method further comprising:

determining, via the processor and using the graph, a second main inlet associated with the second pattern at the graph, a second success outlet associated with the second pattern at the graph, and a second error outlet associated with the second pattern at the graph; and determining, via the processor, a second modification based on the second main inlet, the second success outlet, and the second error outlet, the modifying of the graph to generate the first modified graph further based on the second modification.

6. The method of claim 1, wherein the graph includes a plurality of nodes, the method further comprising:

receiving an indication of a set of nodes from the plurality of nodes selected by a user, the first modification further determined based on the set of nodes.

7. The method of claim 1, further comprising:

receiving, via the processor, a representation of a second natural language prompt;

sending, via the processor, a representation of the second natural language prompt to the LLM, the LLM configured to generate an output indicating that the second natural language prompt does not include any patterns; and refraining, via the processor and in response to generating the output indicating that the second natural language prompt does not include any patterns, from modifying at least one of the graph or the first modified graph.

8. A non-transitory processor-readable medium storing code representing instructions to be executed by one or more processors, the instructions comprising code to cause the one or more processors to:

receive serially each natural language prompt from a plurality of natural language prompts;

as each natural language prompt from the plurality of natural language prompts is received and without waiting for remaining natural language prompts from the plurality of natural language prompts to be received, identify at least one pattern based on that natural language prompt by inputting that natural language prompt into a large language model (LLM), a plurality of patterns resulting from the plurality of natural language prompts being input into the LLM;

as each natural language prompt from the plurality of natural language prompts is received and without waiting for remaining natural language prompts from the plurality of natural language prompts to be received, update a graph based on the at least one pattern associated with that natural language prompt, a modified graph resulting from the graph being iteratively updated based on the plurality of patterns; and reformat the modified graph to generate a reformatted graph, the reformatted graph displayed via a no-code user interface that receives a set of user inputs and generates a set of responses to the set of user inputs generated based on the reformatted graph.

9. The non-transitory processor-readable medium of claim 8, wherein at least one natural language prompt from the plurality of natural language prompts is received without receiving an indication of at least one node selected by a user and included in the graph.

10. The non-transitory processor-readable medium of claim 8, wherein the modified graph includes a first number of edge crossings and the reformatted graph includes a second number of edge crossings that is less than the first number of edge crossings.

11. The non-transitory processor-readable medium of claim 8, wherein the plurality of natural language prompts is received from a remote compute device and the instructions further comprise code to cause the one or more processors to:

cause the reformatted graph to be displayed at the remote compute device.

12. An apparatus comprising:

a memory; and a processor operatively coupled to the memory, the processor configured to:

receive a first natural language prompt;

input the first natural language prompt into a large language model (LLM) to identify a first pattern;

generate a graph based the first pattern and at a no-code user interface, the graph representing a first conversation flow;

receive a second natural language prompt that includes a representation of a desired modification to the first conversation flow;

input the second natural language prompt into the LLM to identify a second pattern; and update the graph, at the no-code user interface, based the second pattern and without generating a new graph, to generate a modified graph that represents a second conversation flow that incorporates the desired modification to the first conversation flow.

13. The apparatus of claim 12, wherein the graph is a first graph and the processor is further configured to:

receive a third natural language prompt;

input the third natural language prompt into the LLM to identify a third pattern; and generate a second graph that is new and not a modified version of the first graph based the third pattern.

14. The apparatus of claim 13, wherein the third natural language prompt is received without receiving an indication of any nodes included in the modified graph that have been selected by a user.

15. The apparatus of claim 12, wherein the processor is further configured to:

receive an indication of at least one node included in the graph and selected by a user, the modified graph further generated based on the at least one node.

16. The apparatus of claim 12, wherein the processor is further configured to:

determine a main inlet, a success outlet, and an error outlet at the graph, the modified graph further generated based on the main inlet, the success outlet, and the error outlet.

17. The apparatus of claim 12, wherein the processor is further configured to:

receive a third natural language prompt;

input the third natural language prompt into the LLM to generate an output that indicates the third natural language prompt does not include any patterns; and in response to generating the output, refrain from updating at least one of the graph or the modified graph.

18. The apparatus of claim 12, wherein the processor is further configured to:

establish a starting point at the graph, the modified graph further generated based on the starting point.

19. The apparatus of claim 12, wherein the graph is generated and updated at the no-code user interface without writing code and without using a template.

20. The apparatus of claim 12, wherein the first pattern is associated with a pattern context definition indicating at least one parameter the first pattern requires.

* * * * *